UNITED STATES PATENT OFFICE 1,980,192

AQUEOUS DISPERSIONS

Jacob M. Fain, Brooklyn, N. Y., assignor, by mesne assignments, to The Patent and Licensing Corporation, New York, N. Y., a corporation of Massachusetts No Drawing. Application February 3, 1930, Serial No. 425,725

7 Claims. (Cl. 134—1)

This invention relates to improvements in aqueous dispersions of materials normally immiscible with water, and is more particularly concerned with aqueous dispersions of solid or semi-solid bitumens, such as asphalt and the like, made with paste forming mineral colloids contained in an aqueous vehicle constituting the continuous phase of the dispersion.

Bituminous dispersions made with aqueous suspensions of bentonite and similar mineral colloids, or mixtures thereof with other powders, are well known and have found wide application in various arts. They are extensively employed, for example, as protective coatings for surfaces of metal, wood, and the like, and when employed in a layer or film of sufficient thickness, they provide a protective coating in many respects superior to the ordinary coatings of asphalt or asphalt cut-backs.

The effectiveness of dispersion coatings for certain uses is, of course, largely dependent upon their impermeability to water. Extended study of these coatings has shown that despite the apparent unity and coherence thereof, after the elimination of the water and coalescence of the dispersed particles, permeable avenues nevertheless exist in the water-free film of the dispersion. This may be explained by the fact that when a film of a dispersion of the type here referred to, is permitted to dry, the bentonite or similar dispersing agent, which exists in the emulsion as adsorbed films surrounding the particles of bitumen, becomes segregated into film areas or walls of honeycomb structure. The dispersed particles of bitumen coalesce, after drying, by permeation through these interstitial walls or films of bentonite, or the like. It will be apparent, therefore, that the rate of coalescence is governed largely by the rigidity of these interstitial walls, the surface tension relationship between the bitumen and the wall structure, or their resistance to rapid wetting by the coalescing particles of bitumen.

It has heretofore been proposed to increase or accelerate the rate of coalescence of the particles in the water-free film, by treating the aqueous dispersion with various electrolytes, such as for example, acids, acidic salts, or the like. These reagents, however, when employed in amounts sufficient to accelerate coalescence in the water-free film, result in greater or less flocculation of the emulsion and induce a thickening thereof which generally necessitates beating the emulsion or substantially increasing the water content, in order to restore it to proper consistency for general application.

I have found, however, that the properties of the water-free film of emulsions of the type described, may be improved as to rapidity with which the water-free film becomes impermeable to water, without an ensuing substantial flocculation of the emulsion by combining with the emulsion finely divided oxides, which do not substantially flocculate the emulsion. Among the substances which I have found beneficial for this purpose, are, antimony trioxide, antimony pentoxide, and titanium oxide. In carrying out the invention, emulsions of bituminous material, such as asphalt of 100 to 200° F. melting point made with bentonite, or similar emulsifying agent so as to produce an emulsion containing 55 to 65% asphalt, 2 to 3% bentonite, and the balance water, may be treated with one of these oxides in quantities of ½ to 5% by weight on the emulsion.

These substances may be incorporated in emulsions of the character referred to without substantial flocculation of the dispersed particles, or at least, such degree of flocculation as is incurred by the use of acids, acidic salts, or the like. In some instances, the incorporation of the oxide in the emulsion may cause a slight shortening of the body thereof, but this effect can usually be offset by slight additions of a bodying agent such as pyrogallic acid in quantities of say 0.1% by weight of the emulsion.

The effect of the finely divided oxides employed according to the invention, is apparently to facilitate wetting of the wall structure by the bituminous material or to embrittle or render fragile, the interstitial walls of the bentonite, or similar emulsifying agent in the water-free film, and thus permit more rapid coalescence of the dispersed bitumen through the interstitial walls, this effect being evidenced by increased ductility of the water-free film after subjection thereof to overnight exposure to the action of water.

I claim as my invention:

1. The process of treating aqueous bituminous emulsions of the type formed with a paste forming mineral powder as the emulsifying agent, and which is substantially free from protective colloids, which comprises incorporating in the emulsion a finely divided oxide of an amphoteric element that does not substantially flocculate the emulsion and adapted to accelerate coalescence of the particles of bitumen in the water-free film.

2. The process of treating aqueous bituminous emulsions of the type formed with a paste forming mineral powder as the emulsifying agent, and which is substantially free from protective colloids, which comprises incorporating in the emulsion a sparingly soluble finely divided oxide of an amphoteric element that does not substantially flocculate the emulsion and adapted to acclerate coalescence of the particles of bitumen in the water-free film.

3. The process of treating aqueous bituminous emulsions of the type formed with a paste forming mineral powder as the emulsifying agent, and which is substantially free from protective colloids, which comprises incorporating in the emulsion one-half to five percent by weight of a finely divided oxide of an amphoteric element that does not substantially flocculate the emulsion and adapted to accelerate coalescence of the particles of bitumen in the water-free film.

4. An aqueous dispersion of bitumen containing paste forming powder as the dispersing agent, said dispersion being substantially free from protective colloids and having incorporated in the aqueous phase thereof, small quantities of an oxide of an amphoteric element which does not substantially flocculate the dispersion and adapted to accelerate coalescence of the bitumen particles in a water-free film of the dispersion.

5. An aqueous dispersion of bitumen containing paste forming powder as the dispersing agent, said dispersion being substantially free from protective colloids and having incorporated in the aqueous phase thereof, small quantities of a sparingly soluble oxide of an amphoteric element which does not substantially flocculate the dispersion and adapted to accelerate coalescence of the bitumen particles in a water-free film of the dispersion.

6. An aqueous dispersion of bitumen containing paste forming powder as the dispersing agent, and which is substantially free from protective colloids and having incorporated in the aqueous phase thereof, small quantities of a finely divided oxide of an amphoteric element adapted to accelerate coalescence of the bitumen particles in a water-free film of the dispersion, said dispersion being not substantially flocculated by said oxide.

7. An aqueous dispersion of bitumen containing bentonite-like material as the dispersing agent, said dispersion being substantially free from protective colloids and having incorporated in the aqueous phase thereof, small quantities of an oxide of an amphoteric element which does not substantially flocculate the dispersion and adapted to accelerate coalescence of the bitumen particles in a water-free film of the dispersion.

JACOB M. FAIN.